United States Patent [19]
Whittaker et al.

[11] Patent Number: 5,459,836
[45] Date of Patent: Oct. 17, 1995

[54] INTER-PROCESSOR COMMUNICATION NET

[75] Inventors: Bruce E. Whittaker, Mission Viejo; Saul Barajas, Capistrano Beach; Leland E. Watson, Mission Viejo, all of Calif.

[73] Assignee: Unisys Corporation, Blue Bell, Pa.

[21] Appl. No.: 970,536

[22] Filed: Nov. 2, 1992

Related U.S. Application Data

[63] Continuation of Ser. No. 478,813, Feb. 9, 1990, abandoned.
[51] Int. Cl.$^6$ .............................. G06F 3/00; G06F 15/16
[52] U.S. Cl. ................ 395/200.07; 364/228; 364/229; 364/230; 364/240; 364/251; 364/251.1; 364/251.3; 364/255.1; 364/259.2; 364/261.3; 364/DIG. 1; 395/200.08; 395/827; 395/847; 395/650
[58] Field of Search .................................. 395/200, 650, 395/700

[56] References Cited

U.S. PATENT DOCUMENTS

| | | |
|---|---|---|
| 4,161,786 | 7/1979 | Hopkins et al. ........................ 364/900 |
| 4,387,425 | 6/1983 | El-Gohary ............................... 364/200 |
| 4,499,538 | 2/1985 | Finger et al. ........................... 364/200 |
| 4,816,990 | 3/1989 | Williams ................................. 364/200 |

*Primary Examiner*—Kevin A. Kriess
*Assistant Examiner*—John Q. Chavis
*Attorney, Agent, or Firm*—Alfred W. Kozak; Mark T. Starr; Robert R. Axenfeld

[57] ABSTRACT

A message transfer system between multiple processors in a network. Each processor includes an interprocessor communications (IPC) hardware unit having an unique address count. An address count generator in a designated IPC hardware unit generates a sequence of binary count numbers such that when the generated count number matches the address of the IPC hardware unit, then that particular hardware unit and its associated processor are granted a time period of bus access for sending messages on the IPC network bus to other processors. Messages on the IPC network bus can be received by an IPC hardware unit at any time irrespective of the generated count number. Any sending processor that has bus access can concurrently provide multiple messages where each of the multiple messages is directed to each particular processor for reception. Thus one sender, with bus access, can communicate with multiple receivers during its transmission onto the IPC network bus connecting the processors.

10 Claims, 6 Drawing Sheets

ALL IPC NET SIGNALS ARE BI-DIRECTIONAL
-B INDICATES AN ACTIVE LOW SIGNAL.

14d—IPC-DATA IS 16-BIT DATA BUS.
14s—ISTB-B IS IPC STROBE SIGNAL.
14a—IACK_B IS IPC ACKNOWLEDGE SIGNAL.
14c—ICT(1:0)-B ARE TWO IPC ACCESS COUNTER SIGNALS.

SEE LOGIC EQUATIONS TABLE I

FIG. 5C

SEE LOGIC EQUATIONS TABLE II

INTER-PROCESSOR COMMUNICATION NET

This is a continuation of application Ser. No. 478,813, filed on Feb. 9, 1990, now abandoned.

FIELD OF THE INVENTION

This disclosure involves a simplified and minimal cost means for enabling communications between processors in a multiple processor network permitting any processor to initiate and receive communication with any other processor in this system.

BACKGROUND OF THE INVENTION

With the developing complexity of networks and systems for computer communications, there are many applications of multiple processor computer systems in which it is, of course, necessary for each processor to send and receive messages to/from other processors in the system. This type of operation may be designated as "an inter-processor communication net", and such types of communication nets require many different types of communications which may involve:

(1) system initialization status and commands;

(2) system event information such as task completion, notification, and hardware or software interrupt signal information;

(3) signals for assignment of system tasks, jobs, and I/O operations between processing elements;

(4) operator signal inputs and maintenance interface signal conditions involving such operations and halting and/or starting the system into operation.

It is quite commonly known that large multi-processor systems will use a "mailbox" mechanism for purposes of passing messages through specific locations in main memory which routinely stores the instruction microcodes for each processor. However, this type of operation still requires a signalling method wherein one processor may notify another processor that a message or a response is available in that processor's "mailbox". The simple, efficient, "interprocessor communication net" described herein will manage to provide this type of attention mechanism such that a minimum amount of information needs to be transferred.

SUMMARY OF THE INVENTION

The presently described system presents a simple, low-cost communication signalling network useful in a multi-processor system network having from one to four main processing units. This arrangement could be called an "inter-processor communication net" or IPC.

Each processor in the network is provided with a hardware IPC unit which connects to the IPC hardware units of each of the other processors.

The IPC unit permits equal access opportunity for each processor to reach into the IPC signal network even though regular processing can continue during the time that signal messages are being transmitted. The IPC unit also permits multiple signal messages to be received and held until serviced by the software of the receiving processor.

Each processor is provided with its own unique IPC address which will have equal access and power on the network.

Any message received by a given processor is handled by the IPC unit hardware which takes care of the network protocols and holds the network information after which it can provide a hardware interrupt to the processor's software to indicate the reception of an IPC message.

A simple access mechanism is used to allow each processor access to the network without affecting any other messages being transmitted. Additionally, a simple fixed message format is used for all messages on the IPC net to permit messages to be sent by any processor to any other processor.

DESCRIPTION OF PREFERRED EMBODIMENT

Figure 1:
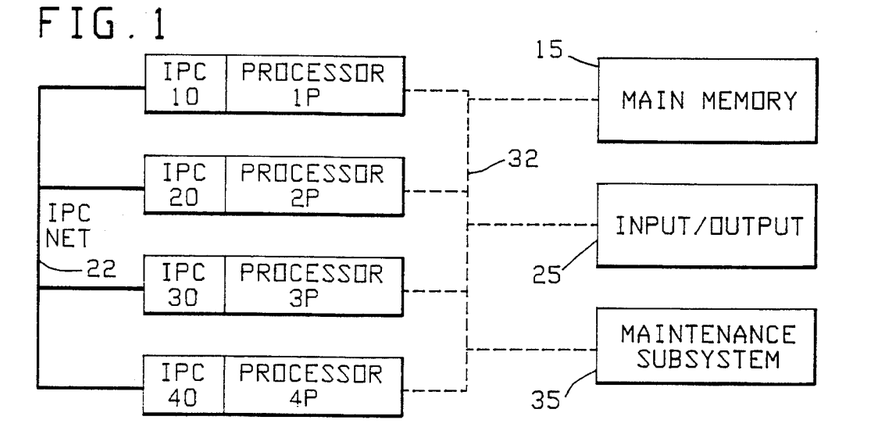
FIG. 1 is a system intercommunication diagram showing the interconnection of four possible processors.

Referring to FIG. 1, there is seen an overall network block diagram of the interprocessor communication net.

A multiple number of processors such as 1P, 2P, 3P and 4P are shown to each have their own individual IPC hardware unit respectively shown as 10, 20, 30 and 40. Each of the IPC hardware units are connected by the IPC network bus 22. The system resources, as main memory 15, I/O subsystem 25, and maintenance subsystem 45, are connected by the resource bus 32 to each of the processors.

Additionally, each of the processors are interconnected to each other by means of a bus 32 which also connects the processors to a main memory 15, and input/output subsystem 25, and the maintenance subsystem 35.

In order to adequately provide for the interprocessor signaling functions, the IPC network provides the following system functions:

(i) allows equal access opportunity for each system processor (1P, 2P, 3P, 4P) to the IPC signal network;

(ii) provides separate, independent IPC logic to allow regular processing to continue while signal messages are being transmitted.

(iii) uses a minimum of normal processing resources to allow regular system processing to proceed;

(iv) provides "soft" addressability of the IPC hardware units, thus allowing the hardware units of all processors to be identical;

(v) allows multiple signal messages to have been received and held until serviced by the receiving processor's software.

The IPC net of FIG. 1 allows up to four processors to communicate with each other. Each processor has a small extra hardware unit added to provide the IPC function, these are shown as units 10, 20, 30 and 40. This hardware is identical for all the processors and the IPC function is controlled by the operating software in each of the processors.

Each processor has its own unique IPC address. This address is a "soft" value and is set up at system initialization time by the maintenance subsystem 35. These addresses will have values of 00, 01, 10, and 11, binary. Each address value has equal access and power on the network. The only address restriction is that any system must have a processor present which has an address of "00". Of course, if more than 4 processors are in the network, then the maintenance subsystem would provide an appropriately longer sequence of address values to identify each processor's IPC hardware unit.

When the operating software in a processor requires a message to be sent to another processor, it will execute an IPC command containing the message to its associated IPC hardware unit (such as 10, 20, 30, 40). This hardware unit will then process and transmit the message over the network. The sending processor is immediately free to continue its normal system processor operations.

When a message is received by a given processor, its IPC hardware unit takes care of the network protocols and holds the message information. It also provides a "hardware interrupt" to the processor software indicating the reception of an IPC message. The processor software can service the interrupt and read the message at its convenience.

If additional messages are received after a previous message has been received (but not yet read by software), the IPC hardware unit will combine it with the previous message, but with no loss of any message information. When the processor software of a given processing unit reads an IPC message, a message buffer in the IPC hardware unit is "cleared".

Figure 5:
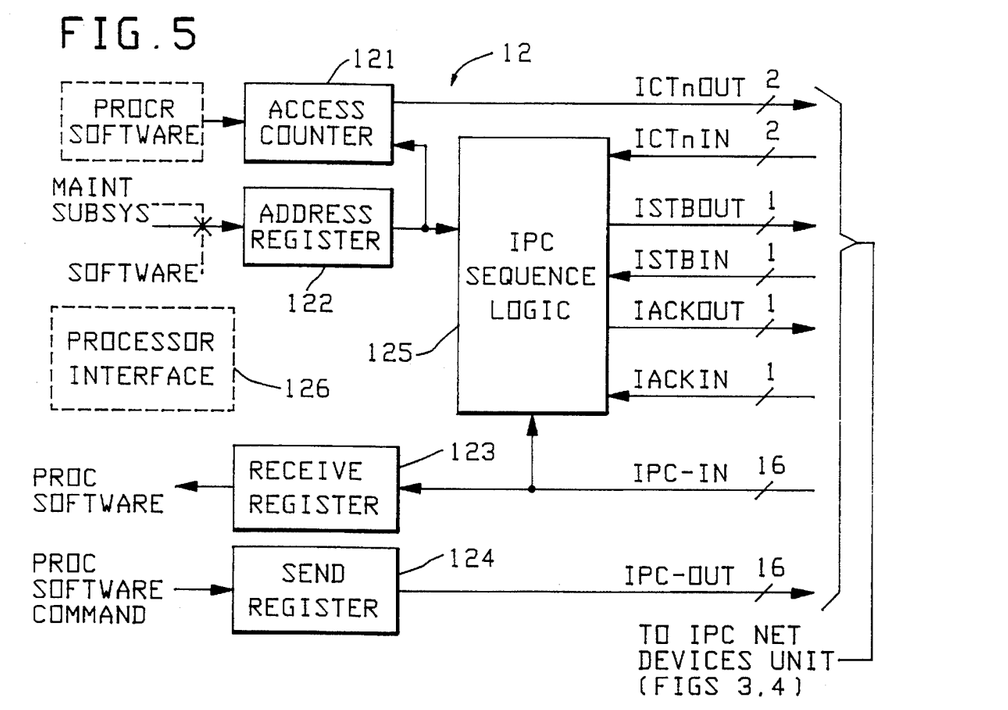
FIG. 5 is a more detailed block diagram of the IPC control logic of FIG. 2.
Figure 8:
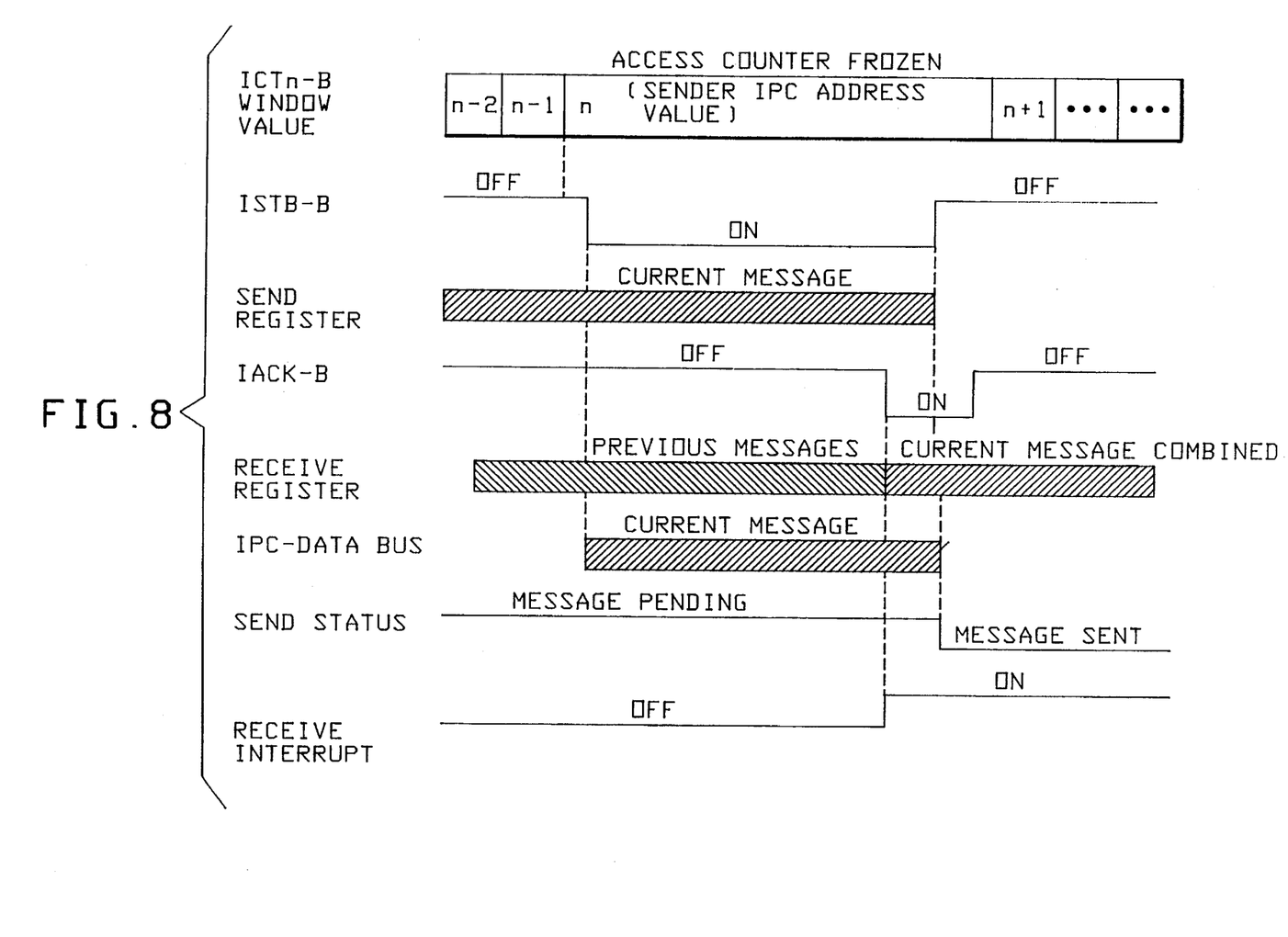
FIG. 8 is a correlation diagram showing the IPC message protocol operations.

Since all processors (and all the IPC hardware units) share the same simple IPC network resources, a simple "access mechanism", described in connection with FIG. 5, is used to allow each processor access to the net without affecting other messages being transmitted. Once access to the network has been granted, a simple handshake protocol, described in connection with FIG. 8, is used by the IPC hardware unit to transmit the message.

Figure 6:
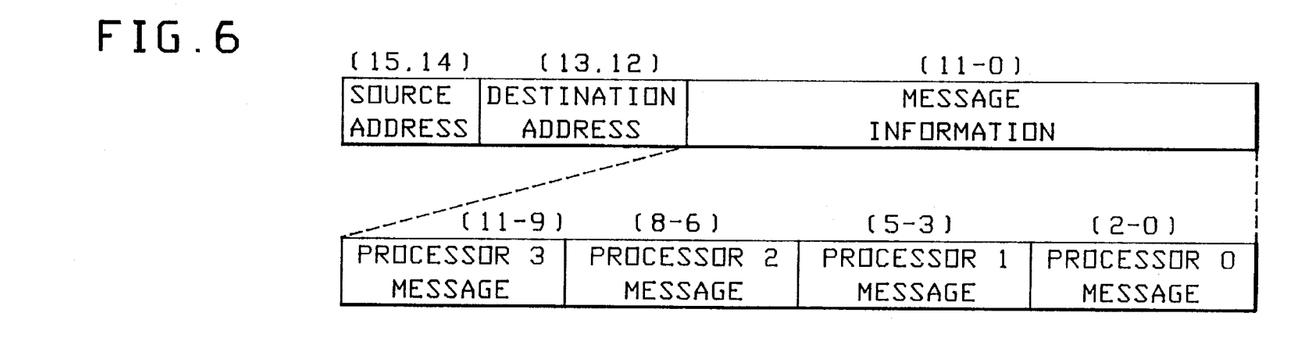
FIG. 6 shows the protocol format of the IPC messages used in the network.

A simple, fixed message format, described in FIG. 6, is used for all messages on the IPC net. This allows messages to be sent by any processor to any other processor and including itself. This also provides the ability to do an "OR" function or to combine several messages together to be read at one time by the processor software.

In the overall system diagram of FIG. 1, there are shown the system resources such as the main memory 15, the input/output subsystem 25, and the maintenance subsystem 35. This diagram also shows the separate IPC net with its hardware units. This separate IPC facility allows normal processor operations to continue over bus 32 while message traffic takes place on the IPC network bus 22. The extra hardware involved is minimal and inexpensive to the system.

Figure 2:
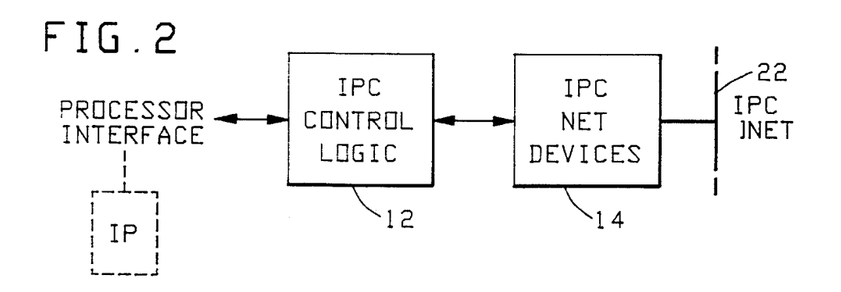
FIG. 2 is a block diagram showing the major elements and interfaces of the IPC hardware units in each processor.

FIG. 2 is a block diagram of the IPC hardware units (10, 20, 30, 40) in each processor and shows the major subunits and interfaces involved. Thus, in FIG. 2, the IPC hardware unit 10 would have a IPC control logic unit 12 and an IPC net devices unit 14. Each of these blocks and subunits are identical for each of the processors involved.

Figure 3:
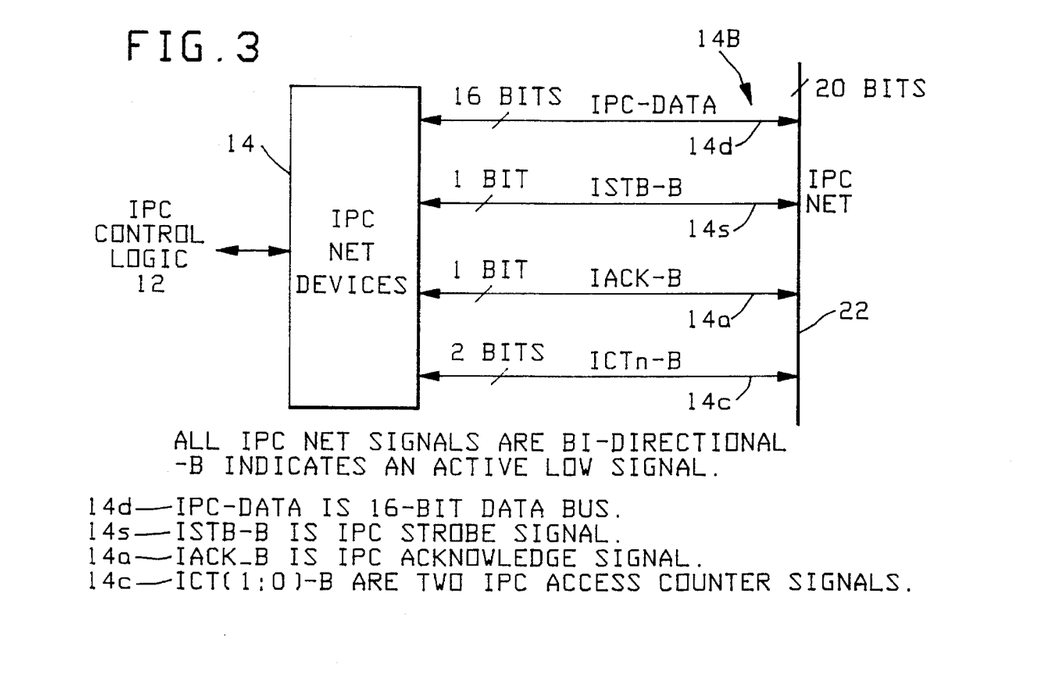
FIG. 3 is a drawing showing the signals on the IPC net.

FIG. 3 illustrates the bus connections and signals on the IPC net bus 22. The IPC Net Devices unit 14 connects to the IPC net bus 22 by means of a series of connections, the major connection of which is the IPC data bus $14_d$ of 16 bits. Additional connections between the net bus 22 and the net devices unit 14 are seen as the IPC strobe signal line $14_s$, the IPC acknowledge signal $14_a$, both of which are of one-bit size, while the IPC access counter signals are shown on line $14_c$ as composed of 2 bits. The total group of 20-bit lines shown in FIG. 3 may be designated as interconnecting bus 14B which forms the IPC net bus 22. All four of the processors tie into these signals which involve certain usages and protocol which will be discussed hereinafter.

In FIG. 3 it is seen that all the IPC net signals are bi-directional and the designation "–B" indicates an active low signal.

Figure 4:
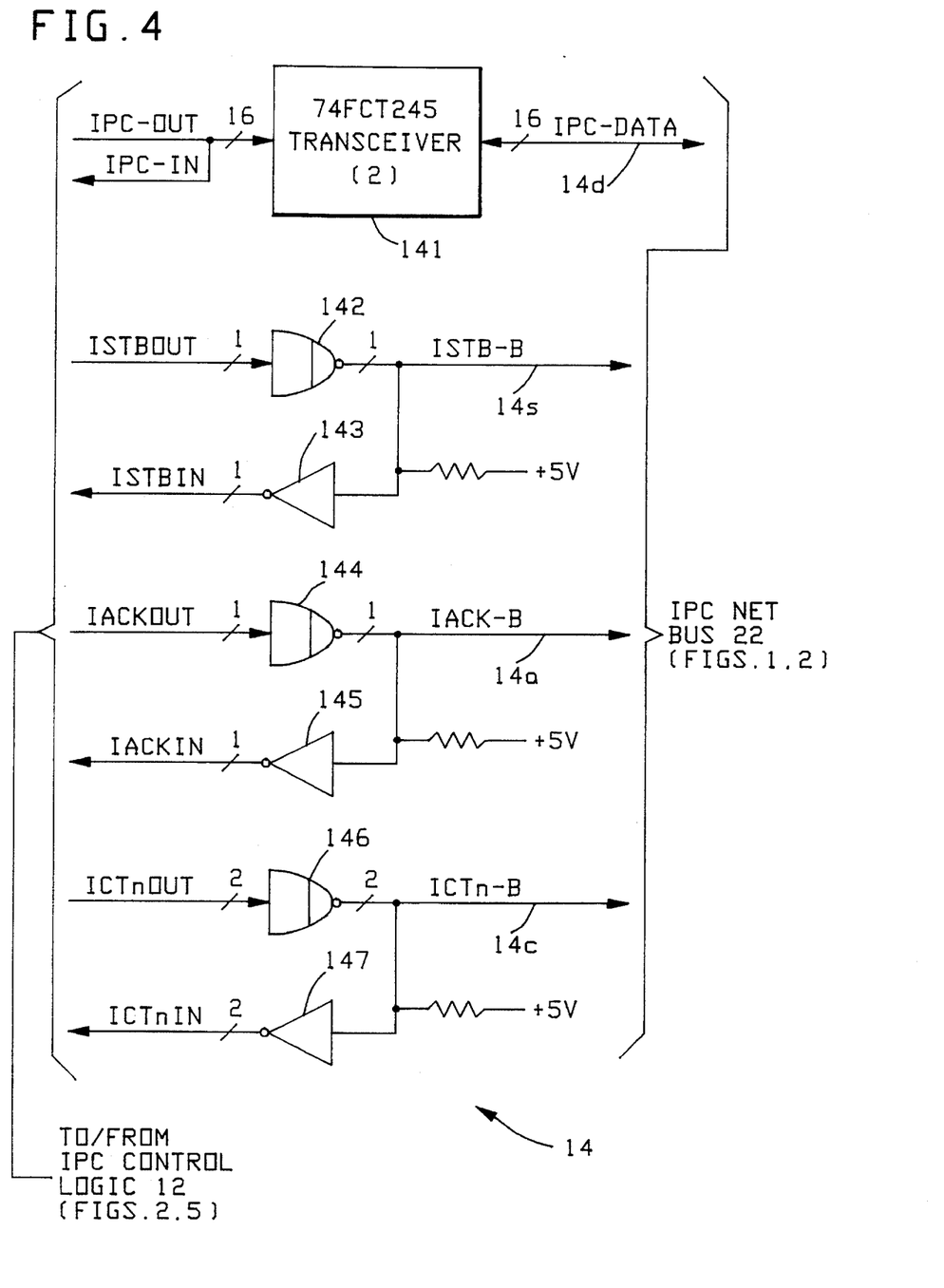
FIG. 4 is a more detailed diagram of the IPC net devices unit of FIGS. 2 and 3.

FIG. 4. shows the IPC net drivers and receivers indicating the actual circuit devices of net device unit 14 used to interface to the IPC net bus 22. Each of the devices involved are standard, low-cost devices. The IPC data bus $14_d$ is handled by the use of two 8-bit, bi-directional transceiver chips 141. The control signals $14_s$, $14_a$, $14_c$ are outputs from the NAND open collectors 142, 144,146. Each of these signals is split off via inverters 143, 145, 147, and fed back to the control logic 12, FIGS. 2 and 5.

These control signals of FIG. 4 are driven with simple, common-collector NAND gates 142, 144, and 146 respectively, with pull-up resistors on each line. Note that all the signals on the IPC net (FIG. 3) are bi-directional, and that each of these are split into uni-directional signals (FIG. 4) for use in the control logic 12, FIG. 2.

The IPC control logic block 12 of FIG. 2 is shown in expanded form in the diagram of FIG. 5 which indicates the IPC control logic block unit in more detail.

Each IPC unit (such as 10, 20, 30, 40) has a three-bit binary counter called an "access counter" 121 (FIG. 5) which is used for the net access mechanism described in connection with FIG. 7. This access counter 121 can source the IPC net signal lines 22, designated ICTn-B, $14_c$ (FIG. 4) and ICTnOUT of FIG. 5.

Each IPC hardware unit also has a two-bit "address register" 122, FIG. 5, which can be initially loaded by either the maintenance subsystem 35 or by the processor software. This register holds the address value for the particular IPC device hardware unit.

Messages received on the IPC net bus 22 which are addressed to this particular IPC device hardware unit are held in the Receive Register 123 of FIG. 5 which is a 16-bit register. This register can be used to combine numerous numbers of received messages. The register 123 (Receive Register) is read out by the processor software by command.

Each IPC hardware unit (10, 20, 30, 40) has a 16-bit "Send Register" 124 which is loaded by a processor software command. This register holds the message which is to be sent over the IPC net bus 22.

The IPC sequence logic unit 125 is used to control the IPC net protocol which is described in connection with FIG. 8.

Figure 5A:
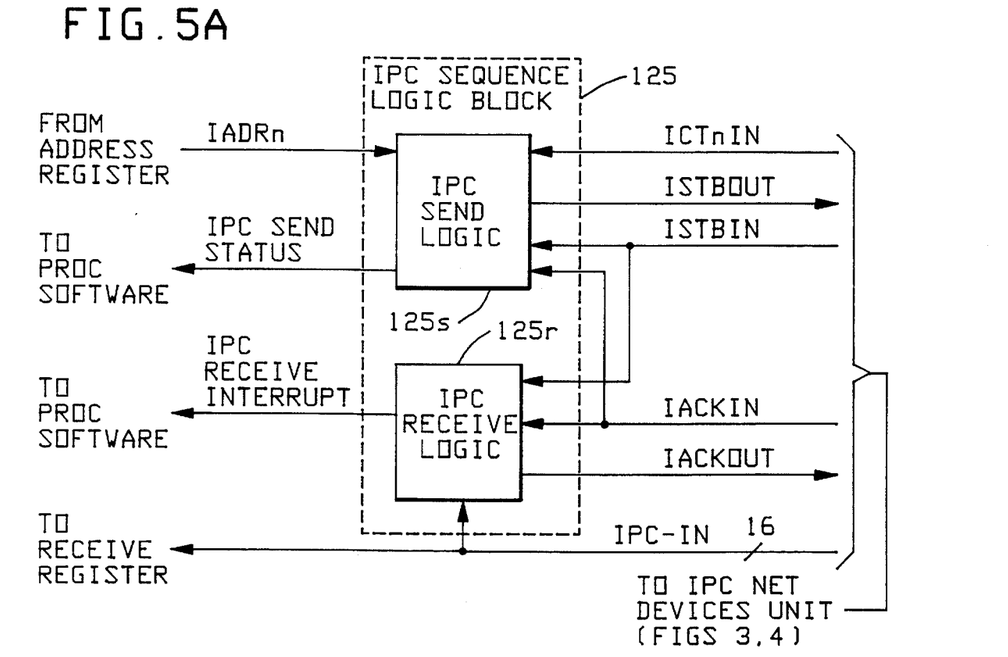
FIG. 5A is a drawing in block form showing the IPC sequence logic of FIG. 5 in more detail.
Figure 5B:
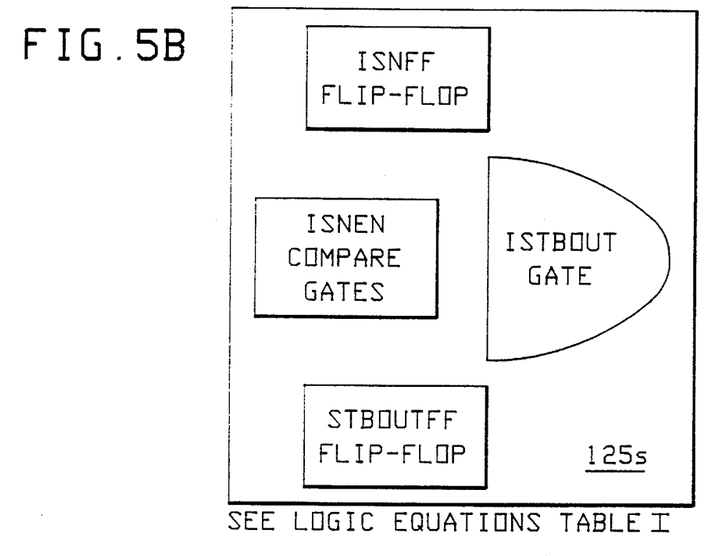
FIG. 5B is a schematic drawing of the IPC SEND logic block of FIG. 5A shown in more detail.
Figure 5C:
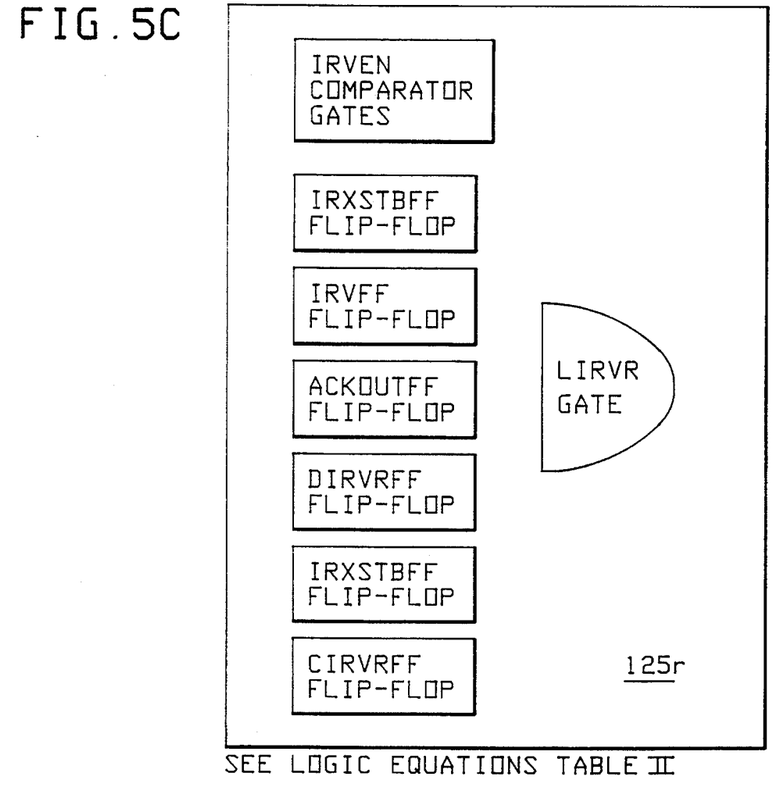
FIG. 5C is a schematic drawing of the IPC RECEIVE logic block of FIG. 5A shown in more detail.

The IPC sequence logic unit 125 is shown in more detail in the drawings of FIG's 5A, 5B, and 5C. FIG. 5A shows a drawing of the IPC sequence logic block 125 as divided into a Send Logic unit $125_s$ and a Receive Logic unit $125_r$. FIG. 5B shows a schematic drawing of the IPC Send Logic block $125_s$ which will be later defined through a set of send logic equations.

Likewise, the receive logic block 125$_r$ is shown in schematic form in FIG. 5C and subsequently defined according to a set of logic equations.

In FIG. 5, the input lines to the IPC sequence logic are shown as: the two-bit line for the access counter signal designated ICTnIN; the incoming strobe signal designated ISTBIN; and the acknowledge signal of one bit designated IACKIN. Additionally the sequence logic 125 has a one-bit output signal line for the strobe output designated ISTBOUT and the acknowledge line designated IACKOUT.

IPC PROCESSOR INTERFACE: At the left side of FIG. 5, there is seen a block entitled processor interface 126. This involves the processor software which controls the IPC hardware unit (10, 20, 30, 40) with four commands. These four commands include:

(a) IPC CLEAR COMMAND: This command can be used to put the IPC hardware unit into an initialize state.

(b) LOAD IPC ADDRESS: This command is used to set the IPC address value.

(c) IPC SEND COMMAND: This command initiates the transmission of an IPC message to a processor. The message is loaded into the SEND register, 124 of FIG. 5.

(d) IPC READ COMMAND: This command allows the software to read messages received on the net. When this command is executed and the message has been read, the Receive Register 123 is automatically cleared.

In addition to the four software IPC commands, the IPC hardware unit (10, 20, 30, 40) provides two "status indicators" back to the processor software as follows:

(i) IPC SEND STATUS: This bit can be read by the software. If it is "ON", there is a pending message to be transmitted.

(ii) IPC RECEIVE INTERRUPT: This is a hardware processor interrupt indicating that an IPC signal message has been received and is waiting to be read by software.

IPC MESSAGE FORMAT: FIG. 6 shows the format of IPC messages. This is the format of messages used on the IPC net bus 22, in the Receive Logic 125$_r$ and in the Send Logic 125$_s$, FIG. 5A, and over the processor bus 22 to the IPC hardware unit (10, 20, 30, 40).

In FIG. 6, the most significant two bits (15, 14) contain the "source address" which is the address of the sending IPC device unit. If several messages have been combined, then, in the Receive Register (123, FIG. 5), these bits contain the address of the most recently received message.

The next two bits (13, 12) contain the address of the receiving IPC devices (destination address). These two bits are used by the IPC logic to receive or to ignore messages on the IPC data lines 14$_d$. Flexibly, the destination address could be expanded to a universal address which would concurrently transmit a message to each processor in the network so that one sending processor could transmit to multiple processors.

The lower twelve bits (11-0) are used for the actual message signalling information (message information) sent between the processors. This particular field of message information is subdivided into four 3-bit fields. One subfield is assigned for messages destined for each of the four possible processors. Thus, the message information can contain at least one message for each of the four processors.

Each processor can send three bits of signal information to each other processor. The actual definition of these bits is "soft" in nature, but might be used to signal attention, or to specify a message in the message "mailbox", or to designate a response to a previously received message.

Messages can be combined in the Receive Register 123, FIG. 5, of each IPC hardware unit (10, 20, 30, 40). This "combining" is the logical "OR" of previously received messages held in the Receive Register with the incoming message.

Each message that is received will cause an interrupt signal to the processor software, which will then read the message(s) at its earliest opportunity. After the message(s) are read, the Receive Register 123 is automatically cleared.

In regard to the IPC message format shown in FIG. 6, each processor message field is seen to be three-bits long. Thus, each processor can receive three bits of information from each of the other processors, including itself.

These three bits from/to each processor may be described as follows:

(1) PROCESSOR ATTENTION: If this bit is "ON", the sending processor has put a message for the receiving processor in a predetermined "mailbox" in main memory.

(2) I/O INITIATE: When this bit is "ON", the sending processor is signalling the receiving processor to commence the I/O operation that is queued in the I/O Queue in main memory.

(3) I/O FINISHED: When this bit is "ON", the sending processor is signalling the receiving processor that a previously initiated I/O operation has been completed.

IPC BUS ACCESS MECHANISM: The bus access mechanism allows each one of the four processor-IPC hardware units equal opportunity for access into the IPC net of bus 22. Since the mechanism used is very simple, it is also very low in cost.

Each IPC hardware device unit (10, 20, 30, 40) has an IPC access counter 121 (FIG. 5). This counter is a three-bit binary counter which is capable of sourcing the ICTn-B signals (on line 14$_c$ of FIG. 4) on the IPC net. Only one processor IPC device unit in the system can actually be the source for the access counter signals at a given time. As a unique IPC address value, the processor and IPC unit with the address value of "00" will be the device to "source" these IPC net signals.

The ICTn-B signals are the upper two bits of the three-bit IPC access counter 121. These are shown on FIG. 5 as ICTnOUT. These signals will be free-running binary count values changing at half the system clock rate. They will run through the values: 00, 01, 10, 11, 00, 01, 10, 11, ... etc.

The value on the ICTn-B lines 14$_c$ at any instant provides a "window" for each processor IPC device unit to control the IPC net. For example, when ICTn-B is equal to 00, then the IPC device unit 0 can control the net if it has a message to send; if ICTn-B is equal to 10, then the IPC device unit 2 can control the net if it has a message to send. This is the unit 20 of FIG. 1.

The window value (FIG. 7) on the ICTn-B lines (FIGS. 4 and 5) remains for two system clock-periods before moving to the next window value. If an IPC hardware unit requires the use of the IPC net, it will activate the strobe line ISTn-B, 14$_s$, during its window time. This strobe signal will freeze the access counter 121 at the current value until the strobe signal is deactivated. During this "frozen window" time, (FIG. 7), the IPC device unit (with address 01) will transmit its message via the message protocol. The bus access mechanism is basically shown in FIG. 7.

Figure 7:
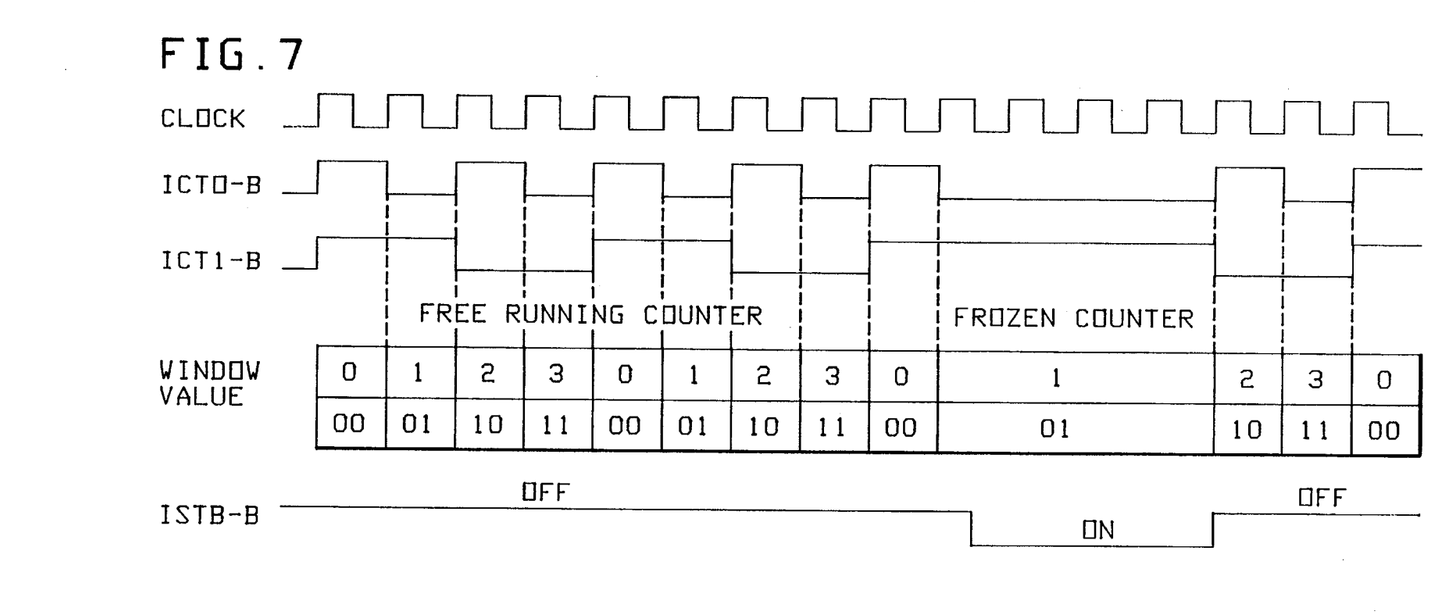
FIG. 7 is a timing diagram showing the net bus access mechanism.

FIG. 7 is a timing diagram showing the sequence of events involving the bus net "access mechanism". It shows the clock signal, which may be an 8-MHz system clock, wherein all the IPC logic, as well as the processor logic, is made synchronous.

The second line in FIG. 7 shows the ICTO-B signal which is the least significant bit of the two-bit IPC counter signals. These bits count in binary at one-half the system clock rate until the count is frozen (held) by the activation of the IPC strobe signal $14_s$. This counter provides the access window for each of the four processors into the IPC net of bus 22. Each processor is allowed onto the bus when the counter value equals the value of its unique IPC unit address value. In the example shown in FIG. 7, the processor's IPC unit value is "01" at the "frozen counter".

The third line of FIG. 7 designated ICT1-B is the most significant bit value of the two-bit IPC counter signal.

The fourth line designated "window value" depicts the equivalent arabic number of the binary values of the IPC counter signals discussed above.

The fifth line of FIG. 7 shows the IPC strobe signal ISTB-B, ($14_s$). This signal is the "OR" of all the strobes from each of the four processors. When it is activated by a processor, which it can only do when the counter equals its IPC address unit value, it freezes the current counter value and also signals all processors to receive a IPC message, (as is also indicated in FIG. 8).

ACCESS OPERATION: As seen in FIG. 7, the IPC counter 121 runs continuously until it is frozen. If a given processor needs access to the IPC network, it waits until the counter value equals its own unique IPC address (previously set by software).

When the counter value is "01", the counter signals the processor IPC logic 125, FIG. 5, to activate its IPC sequence strobe signal. This strobe signal goes to all the processors over the IPC network. It freezes and holds the counter at its current value and also notifies all processors to receive a message.

While the access counter 121 is frozen at a given processor's address unit value, that particular processor has access and control of the IPC net and no other processor may drive onto the net.

When the current processor with net access has completed the transmission of its message, it then drops its IPC strobe signals which, in turn, "frees-up" the counter to continue counting through the processor addresses. At this point, the IPC net is free and available to any other processor to use.

The IPC message protocol and operation is shown in FIG. 8. The first line of FIG. 8 shows the window value (as discussed in FIG. 7) with the designation of the signal as the IPC counter signal, ICTn-B.

The second line of FIG. 8 shows the IPC strobe signal, ISTB-B, which is the "OR" of all the individual strobe signals from each processor. Only one processor can drive this at a time. Only the processor whose "address is on the counter" can do the driving. This signal notifies all processors that a message is on the IPC network.

Line 3 indicates the Send Register in the driving processor logic. It contains the IPC message information previously loaded by software. This register drives onto the IPC network 22 via data signals on bus $14_d$.

Line 4 of FIG. 8 is designated IACK-B and is the IPC acknowledge signal which is the "OR" of all of the individual acknowledge signals from each processor. Again, only one processor can drive this acknowledge line at a time, and only the processor for whom the current message is intended, can do the driving acknowledgement. This processor is specified in bits 13 and 12 (destination) of the IPC message format of FIG. 6. This signal acknowledgement is activated when the receiving processor has received the current message on the bus. The sending processor will deactivate its strobe signal in response to this signal.

The fifth line of FIG. 8 indicates the Receive Register in the receiving processor logic. The incoming IPC message is strobed into this register. This register uses an "OR-ing" mechanism to store the incoming message. That is, the incoming message is "OR-ed" with any previous message still stored in the register. When this Receive Register is loaded, the processor's software is notified to come at its earliest convenience to read the message. When the register is read by software, it is then cleared to zero (empty).

The sixth line of FIG. 8 shows the IPC data bus ($14_d$) which includes the IPC 16 bit network data signals. These signals connect to the transceiver circuits 141, FIG. 4, on all the processors. This is a bi-directional data bus for all IPC messages between all processors. Again, only one processor can drive at a given time, and this will be the sending processor. All of the processors can receive on this bus and the messages on this bus are of the fixed format as shown in FIG. 6.

The seventh line of FIG. 8 is the Send Status line which is an indicator from the IPC logic 12 to the processor software of the sending processor. This indicates whether the Send Register 124, FIG. 5 is full (that is, a message is pending) or is empty (that is, the message has already been sent). The processor software will wait until the previous message has been sent before loading another message for transmission.

The eighth line of FIG. 8 is designated Receive Interrupt. This is a hardware interrupt to the processor software of the receiving processor. It notifies the software of the reception of an IPC message into the Receive Register 123, FIG. 5. It may be noted that sometimes it may take the software some time before it can service this interrupt. Meanwhile, several incoming messages may have been received. When the software finally does read this register, it will actually receive all (several) messages at once.

IPC TRANSMISSION PROTOCOL: When a processor's software needs to send another processor an IPC signal message, it will execute the SEND MESSAGE command to its own IPC hardware unit (10, 20, 30, 40) together with the message to be sent. This message will follow the message format as discussed in FIG. 6. This format will include the proper address values.

Once the software has executed this command, it can continue its normal operations and the IPC hardware unit (10, 20, 30, or 40) will take care of the transmission of the message.

The IPC hardware unit will now contain a message in its Send Register 124, and will take the following steps in order to send it (FIG. 8):

(i) wait for access to the bus 22, that is, wait for its own address window value on the ICTn-B lines;

(ii) activate the IPC strobe signal, ISTB-B;

(iii) wait for the receiving IPC device unit to return the IPC acknowledge signal IACK-B. When the third step (iii) has been done, the message has been sent and received. The IPC hardware unit will indicate to the processor's software regarding the message completion by using the IPC Send Status bit.

The IPC Send Logic $125_s$ (FIG. 5A) and Receive Logic $125_r$ operate independently. The Receive Logic monitors the IPC net at all times by waiting to receive an incoming message. The following conditions will indicate that an incoming message is available and addressed to this particular IPC hardware unit:

(a) The IPC strobe signal, ISTB-B $14_s$, is active "ON"

(14$_s$) (FIG. 8).

(b) The Destination Address field (bits 13, 12), FIG. 6, of the IPC-IN bus are equal to this particular device's Address Register (122, FIG. 5) value.

If the above two conditions are true, then the message on the net is intended for this particular IPC hardware unit and it will be strobed into its Receive Register 123, FIG. 5. The receiving device will then activate the IPC acknowledge signal, IACK-B, 14$_a$, FIG. 4, thus notifying the sending device that the message has been received. The receiving device unit will then notify its processor software with a IPC receive interrupt condition.

Additionally, received messages will be combined into the Receive Register 124 until the software reads it by executing the IPC READ COMMAND at which time the register is cleared.

The previous discussion regarding FIG. 8 showed the IPC net handshake protocol. It may be noted that a receiving device does not necessarily need to respond with an acknowledge immediately, since the sending unit will simply wait until it receives this signal.

IPC SEQUENCE LOGIC: It was previously indicated in FIG. 2 that the IPC control logic block 12 included the IPC sequence logic 125, FIG. 5. This logic is identical for all IPC hardware units in all of the processors involved. This logic controls the IPC net protocol and the access mechanisms. It also provides the status and interrupt indicators to the processor software.

The IPC sequence logic 125, FIG. 5A, can be divided into two independent parts: these are (i) Send logic 125$_s$ and (ii) Receive logic 125$_r$. These two parts of this block in FIG. 5A provide the functions that their names imply.

The following Table I for the Send Logic and Table II for the Receive Logic involve certain logic equations which use the following logical symbols where:

* \* represents the logical AND;
* \+ represents the logical OR function;
* / represents the logical NOT function;
* The "name FF" represents the names of flip-flops.

TABLE 1

| IPC SEND LOGIC | |
|---|---|
| ISNEN | = (IADR = ICTnIN) This is the IPC SEND ENABLE gate which indicates that the Access Count value window is equal to the sender's IPC Address Register. |
| ISNFF | set = (IPC SEND COMMAND) reset = STBOUTFF + (IPC CLEAR COMMAND) This is the IPC SEND STATUS FLIP-FLOP which is set by the execution of the software command and reset when the message has been successfully transmitted. Software may also directly reset it by command. |
| ISTBOUT | = ISNFF \* ISNEN This is the output signal to drive the IPC Strobe signal, ISTB-B. |
| STBOUTFF | set = ISNFF \* IACKIN reset = IACKIN/ This flip-flop captures the incoming IPC Acknowledge signal from the receiving IPC device. |

TABLE II

| IPC RECEIVE LOGIC | |
|---|---|
| IRVEN | = (IADR = IPC-IN: 13, 12) This is the IPC RECEIVE ENABLE gate which is true when the incoming IPC data bus bits 13 and 12 are equal to the IPC Address register. |
| IRXSTBFF | set = ISTBIN \* IRVEN \* DIRVRFF/ \* CIRVRFF/ reset = ISTBIN/ This flip-flop captures the incoming IPC Strobe signal from the sending IPC device. It only captures the Strobe if the receive enable is true. If the processor software is in the process of reading a previous message from the Receive Register, this flip-flop will wait to be set after the register has been read and cleared. |
| IRV-FF | set = IRXSTBFF \* DIRVRFF/ \* CIRVRFF/ \* ACKOUTFF/ reset = DIRVRFF This is the IPC RECEIVE INTERRUPT indicator flip-flop. It is set when an incoming strobe has been captured and the processor is not reading any previous messages. It is reset when the processor reads the current message. |
| ACKOUTFF | set = IRXSTBFF \* DIRVRFF/ \* CIRVRFF/ reset = IRXSTFBB/ This flip-flop drives out the IPC Acknowledge signal to the sending IPC device. It is set when a Strobe has been captured and is reset when the Strobe has been deactivated. |
| DIRVRFF | set = (THE IPC READ COMMAND) reset = (BDACK (processor interface signal) This flip-flop controls the transferring of the Receive Register to the processor when the read command is executed. |
| CIRVRFF | set = DIRVRFF \* BDACK reset = CIRVRFF This flip-flop will clear the Receive Register after the processor software has read it. |
| LIRVR | = IRXSTBFF \* DIRVRFF/ \* CIRVRFF/ \* ACKOUTFF/ This gated term will cause the Receive Register to be loaded with the message on the incoming IPC-IN bus. |

Described herein has been a simple, low-cost communication network for multiple processor systems for up to four processors. With the addition of a simple, low-cost interprocessor communication hardware unit attached to each processor and connected by an interprocessor communication net bus 22, it is possible to pass messages to and from each and any of the processors without significantly disturbing normal operations of any of the processors with the network resources such as main memory, the I/O subsystem and the maintenance subsystem.

The IPC hardware unit uses standard industry drivers and open collector gates to drive the bus permitting minimal cost units to be involved. Further, the bus interconnection between the processors is by means of standard, off-the-shelf ribbon-type cable.

While the disclosure of the preferred embodiment described herein involved four processors, the concept is not limited to four processors only. Thus, by simply widening the IPC data bus 22 and the width of the address fields, there is simple provision for expanding the number of processors that can be involved in the network.

Thus, while the preferred embodiment of the invention has been described in a detailed structure, it is also possible for other implementations to be developed which fall within the scope of the appended claims herein.

What is claimed is:

1. An interprocessor message transfer system communicating on a digital bus means in a multiple processor network, said system comprising:

(a) communication hardware unit means associated with and connected to each associated processor and having a unique address count value for identifying each said communication hardware unit means of each said associated processor, said hardware unit means including:
  (a1) access count signal generation means for generating a sequence of address count values which cycle through each unique address count value of each said associated processor's communication hardware unit means;
  (a2) strobe means to freeze said generated address count value when it matches the said unique address count value of said associated processors communications hardware unit;
  (a3) means to enable said digital bus means access to the associated processor whose hardware unit unique address count value matches said generated address count value, thus to enable said associated processor as a sending processor;
  (a4) means to transmit message data on said digital bus means from said sending processor to one or more receiving processors;
(b) said digital bus means enabling parallel bit digital data transfer, during the period when said generated address count value is frozen, via interconnection to each of said communication hardware unit means;
(c) network resource means including (i) main memory means (ii) I/O means and (iii) maintenance subsystem means, wherein said main memory means includes: a mailbox portion for holding messages associated with each said unique address count value; and wherein said I/O means provides data transfers to/from said processors without interrupting data transfers on said digital bus means; and wherein said maintenance means provides said unique address count value to each of said associated interprocessor communication hardware unit means.

2. The message transfer system of claim 1 which includes:
(a) means for enabling any processor to send a message to any other processor in the network without interrupting normal processor operations in communicating with said main memory means or said I/O means;
(b) means for accumulating messages in each said communication hardware unit means until such time as the said associated processor can receive and process said messages;
(c) means, in said communication hardware unit means, for providing an interrupt to its associated processor software to indicate reception of a message.

3. The message transfer system of claim 1 wherein said access count signal generation means includes:
(a) means for generating said sequence of address count values only when at least one of said interprocessor communications hardware unit means has the unique identifying address count of "00".

4. The message transfer system of claim 1 wherein each of said communication hardware unit means includes:
(a) control logic means for sending and receiving messages and for generating an acknowledge signal when a message has been received, said logic means including:
  (a1) receive register means for holding messages received for the associated processor;
  (a2) send register means for holding messages to be sent to another processor on said digital bus means.

5. A multiple processor network interconnected by a digital bus for equalizing digital bus access for message data transfers between a selected sending processor and receiving processors, said network comprising:
(a) an interprocessor communications (IPC) hardware unit connected to each processor, each said IPC hardware unit including:
  (a1) address register means for holding a unique address value identifying the IPC hardware unit and its connected processor;
  (a2) address count signal generations means, synchronized by a common clock means, to generate a sequence of address count values onto said digital bus means, said sequence of generated address count values occurring in rotation so as to match each one of said unique address values which identify each interprocessor communications hardware unit;
  (a3) strobe means to freeze said generated address count value when it matches said unique address value in said address register means, to select as a sending processor, that processor whose IPC hardware unit's unique address provided the match;
  (a4) bus access enabling means, for said sending processor, to enable message transfer onto said digital bus means;
  (a5) means to receive message data by a receiving processor without interrupting the receiving processor's communications activities;
(b) said digital bus means interconnecting each said processor via its IPC hardware unit;
(c) said common clock means for synchronizing each said address count signal generation means in each of said interprocessor communication hardware units.

6. In a message transfer system for a multiple processor network where each processor connects via a first digital bus means to various network resources such as main memory, an I/O subsystem and a maintenance subsystem, an interprocessor communications (IPC) network comprising:
(a) a plurality of processors connected to each other via a second digital bus means wherein each processor is assigned a unique address value which identifies said each processor and wherein each said processor includes:
  (a1) an interprocessor communications hardware unit for sending and receiving messages under the control of its associated processor software, said hardware unit including:
    (a1a) control logic means providing an interface between said interprocessor communications hardware unit and said second digital bus means, and including:
      (1—1) means to store said unique address value to identify the location of each said processor;
      (1—2) means for generating access count values which increment in step sequence to duplicate each unique address value of each of said processor's interprocessor communications hardware unit in said multiple processor network, and including:
        (i). means to compare each generated access count value with said unique address value of each said processor's interprocessor communications hardware unit;
        (ii). means to continuously repeat said step sequence of access count values;
        (iii). connection means to a common clock generation means:
      (1–3) means to set a freeze period to freeze said access count value when the value of the said access count value matches the said unique address value of a processor's interprocessor communications hardware unit;

(1–4) means for enabling communication, during said freeze period, so that digital signals can be transferred from said processor, whose unique address value matches the generated access count value, to other processor interprocessor communications hardware units, said digital signals including:
(i). message data;
(ii). access count values;
(iii). strobe for freezing said access count values;
(iv). message acknowledgement;

(a2) said second digital bus means forming said network for connecting each said interprocessor communications hardware unit to each of the said interprocessor communications hardware units of each other processor in the said network;

(a3) common clock generation means connected to synchronize each said means for generating access count signals in each of said interprocessor communication hardware units.;

(b) microcode instruction means, in each processor, for setting said unique address value into each interprocessor communications unit;

(c) said main memory including dedicated message areas for holding messages destined for specific processors;

(d) said maintenance subsystem for monitoring the proper operation of said network.

7. The interprocessor communications network of claim 6 wherein each said processor is granted an access period to said second digital bus means during the frozen time period that the said access count signal is equal to the unique address value of one of said processors, and wherein said maintenance subsystem or a selected processor includes:

(i) means to set the said unique address value of each of said processors in a sequential set of number values to insure that each processor will get said access period to said second digital bus means on a rotational basis when said access count signal matches said unique address value.

8. The interprocessor communications network of claim 7 wherein the enabling of access to said second digital bus for any processor is controlled by the said interprocessor communications hardware unit servicing that processor.

9. The interprocessor communications network of claim 6 wherein said means to store includes:

(a) address register means, holding said unique address value for identifying each particular said interprocessor communications (IPC) hardware unit;

(b) and wherein said means to transmit data includes:
(i). send logic means for sending message data in a multiple message format onto said second digital bus means;
(ii). receive logic means for receiving that portion of said message data on said second digital bus means which is designated for the particular said unique address value of the interprocessor communications hardware unit and its associated processor.

10. The interprocessor communications network of claim 9 wherein said multiple message format includes:

(a) a source address signal;

(b) a destination address signal, said signal including destination addresses for one or for multiple numbers of processors;

(c) a message information signal block which includes equal subsection portions of message data for each one of said processors in said network.

* * * * *